(12) United States Patent
Brooker et al.

(10) Patent No.: US 11,546,324 B1
(45) Date of Patent: Jan. 3, 2023

(54) SINGLE USE EXECUTION ENVIRONMENT WITH SCOPED CREDENTIALS FOR ON-DEMAND CODE EXECUTION

(71) Applicant: Amazon Technologies, Inc., Seattle, WA (US)

(72) Inventors: Marc Brooker, Seattle, WA (US); Osman Surkatty, Seattle, WA (US); Mikhail Danilov, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 255 days.

(21) Appl. No.: 16/782,774

(22) Filed: Feb. 5, 2020

(51) Int. Cl.
*H04L 9/40* (2022.01)
*G06F 16/23* (2019.01)
*G06F 16/24* (2019.01)

(52) U.S. Cl.
CPC ...... *H04L 63/0838* (2013.01); *G06F 16/2379* (2019.01); *G06F 16/24* (2019.01); *H04L 63/102* (2013.01); *H04L 63/20* (2013.01)

(58) Field of Classification Search
CPC ... H04L 63/0838; H04L 63/102; H04L 63/20; G06F 16/2379; G06F 16/24
See application file for complete search history.

(56) References Cited

U.S. PATENT DOCUMENTS

| | | | | |
|---|---|---|---|---|
| 8,683,560 B1* | 3/2014 | Brooker | ............ | H04W 12/0431 726/6 |
| 8,769,642 B1* | 7/2014 | O'Neill | .................. | H04L 63/10 726/5 |
| 8,973,108 B1* | 3/2015 | Roth | .................. | H04L 63/08 726/5 |
| 9,077,703 B1* | 7/2015 | Goshen | ................... | H04L 63/08 |
| 9,781,102 B1* | 10/2017 | Knjazihhin | ........... | H04L 63/102 |
| 10,061,613 B1* | 8/2018 | Brooker | ............... | G06F 9/5005 |
| 10,146,931 B1* | 12/2018 | Kronrod | ................ | G06F 21/46 |
| 11,140,157 B1* | 10/2021 | Xia | .......... | H04L 63/18 |
| 2007/0033397 A1* | 2/2007 | Phillips, II | ........... | H04L 9/0866 713/168 |
| 2012/0260089 A1* | 10/2012 | Gupta | ................... | H04L 9/0869 713/164 |
| 2013/0125223 A1* | 5/2013 | Sorotokin | ............ | H04L 9/3213 726/6 |
| 2014/0165166 A1* | 6/2014 | Kurkure | ................ | H04L 63/083 726/6 |
| 2014/0315519 A1* | 10/2014 | Nielsen | ................... | G06F 21/36 455/411 |

(Continued)

*Primary Examiner* — Jason Chiang
(74) *Attorney, Agent, or Firm* — Knobbe, Martens, Olson & Bear, LLP

(57) ABSTRACT

Systems and methods are provided for scoped credentials within secure execution environments executing within virtual machines instances in an on-demand code execution system. In the on-demand code execution system, the execution environments are reset after every request or session. By resetting the single execution environment after each request or session, security issues are addressed, such as side-channel attacks and persistent malware. Additionally, the use of scoped credentials improves security by limiting the access rights for each code execution request or session to the smallest atomic level for the request or session. Following the request or session, the scoped credential is invalidated.

18 Claims, 7 Drawing Sheets

(56) References Cited

U.S. PATENT DOCUMENTS

| | | | |
|---|---|---|---|
| 2015/0286816 A1* | 10/2015 | Adler | G06F 21/45 |
| | | | 726/6 |
| 2015/0350188 A1* | 12/2015 | Gilpin | H04L 63/083 |
| | | | 726/9 |
| 2016/0149894 A1* | 5/2016 | Jneid | H04L 63/0876 |
| | | | 726/7 |
| 2016/0285628 A1* | 9/2016 | Carrer | H04L 9/321 |
| 2021/0099281 A1* | 4/2021 | Sloane | G06F 21/6218 |
| 2021/0385074 A1* | 12/2021 | Adachi | H04L 9/088 |

* cited by examiner

SINGLE USE EXECUTION ENVIRONMENT WITH SCOPED CREDENTIALS FOR ON-DEMAND CODE EXECUTION

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
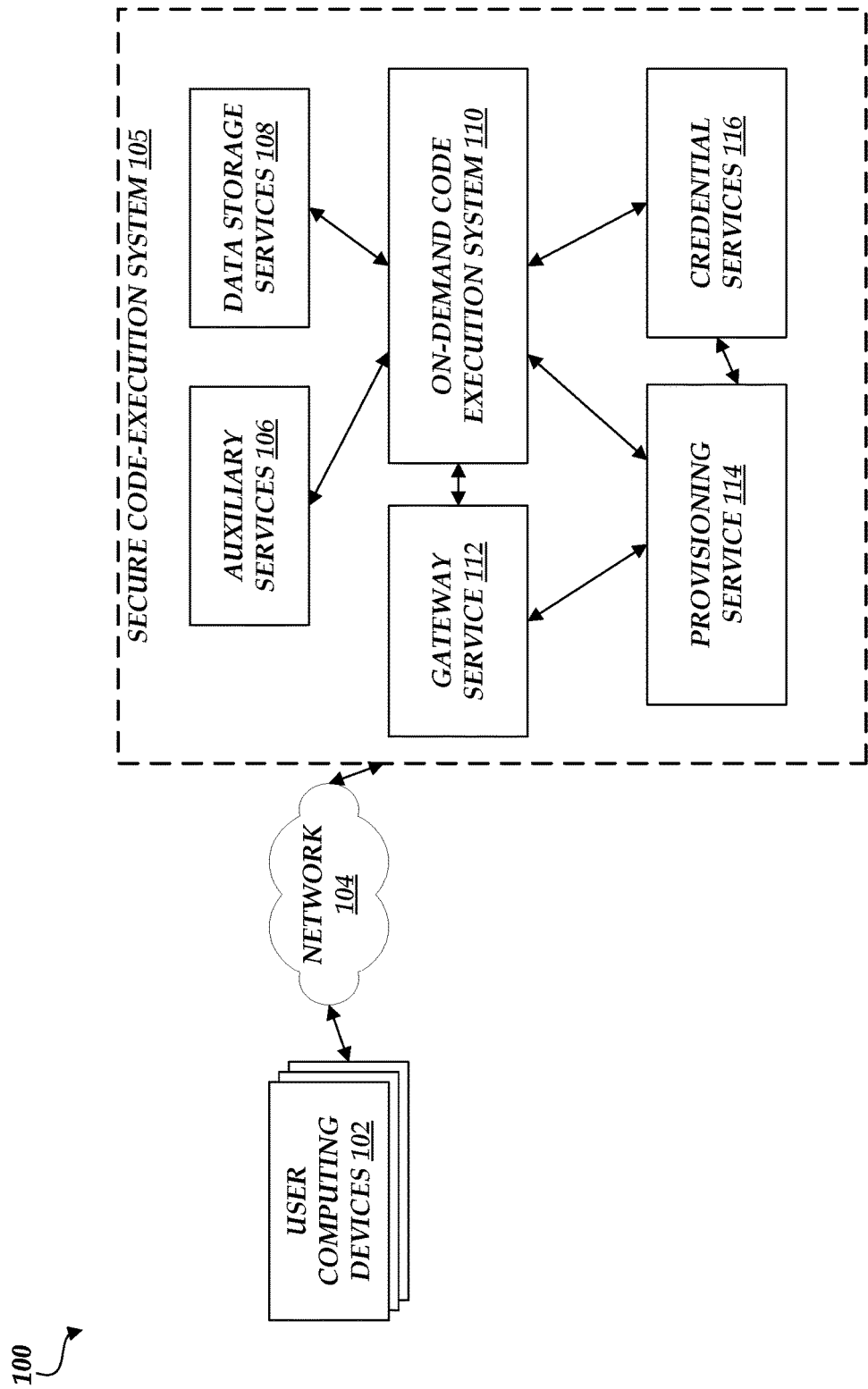
FIG. 1A is a block diagram depicting an illustrative network environment for implementing a secure code-execution system.

Aspects of the present disclosure relate to execution of processes in a "serverless" or "cloud computing" environment. Aspects of the present disclosure also relate to an on-demand code execution system. The on-demand code execution system enables rapid execution of code, which may be supplied by users of the on-demand code execution system that may be implemented in a serverless environment. The terms "serverless" or "cloud computing" environment, as used herein, refer to environments in which responsibility for managing generation, configuration, and state of an underlying execution environment is abstracted away from a user. For example, the user need not create the execution environment, install an operating system, or manage a state of the environment in order to execute desired code in the environment. In an existing on-demand code execution system, a single execution environment can be responsible for handling many requests, across many users. This can introduce security vulnerabilities, such as, for example: (i) malicious requests that have the ability to corrupt the state or code of the server to make it perform unexpected actions; or (ii) the server having privileges to access data for many users.

For example, as described above, in an existing on-demand code execution system, a single execution environment can be responsible for handling many requests, across many users. Execution role credentials for respective users can be pushed to the execution environment. When the on-demand code execution system processes requests from a user to execute code instructions, such as an application, the code instructions can be executed with the execution role credentials that can be reused over multiple requests. The execution role credentials can, for example, provide access to a data store.

Generally described, aspects of the present disclosure are directed to an execution environment that is configured to handle a single request (or session) for a single user. Once the session or request is complete, the execution environment is replaced with another execution environment, such as by having the memory and storage contents reset. However, if credentials are permitted to be reused over multiple requests or sessions, then security vulnerabilities may still exist because an attacker may be able to exploit credentials even though the code is executed in a clean execution environment every time. Thus, more specifically, aspects of the present disclosure are directed to scoped credentials within single-use execution environments. As described herein, the credentials can be scoped to the smallest atomic precision level for each request. For example, the credential can be associated with an individual data item, such as an object, data value, or data row in a data store. The credential may also be valid for a period of time, such as being valid only for the particular request or session or for being valid for a number of uses. Additional example credentials can be associated with network connections or network daemons. Advantageously, even if an attacker is able to extract a credential from a request or an on-demand execution, the attacked will not be able to use the credential for a later request or session. Moreover, since the credential can be associated with a particular request or session, a leak can be tracked down to the particular request or session based on the credential on the underlying data that is leaked.

As used herein, in addition to its ordinary and customary meaning, an "execution environment" can refer to a logical unit created on a host computing device, such as within a virtual machine instance, that uses the resources available on that instance or device. Based on request to execute user code, a new execution environment may be created or refreshed to handle the execution of the user code. Each execution environment can provide a degree of isolation from other execution environments. For example, each execution environment may provide a file system isolated from other file systems on the device, and code executing in the execution environment may have limited or no access to other file systems or memory space associated with code executing outside of the execution environment. An example execution environment can be a container within a virtual machine instance.

The systems and methods described herein may improve security within serverless environments, such as within on-demand code execution systems. As described herein, in some existing on-demand code execution systems, a single execution environment can be responsible for handling many requests, across many users. By resetting an execution environment after each request or session, security issues can be addressed, such as side-channel attacks and persistent malware. As used herein, the term "side-channel attack" generally refers to a security exploit that involves collecting information about what a computing device does when executing code and using that information to reverse engineer the device. The term "side-channel attack" can also generally refer to a situation with a multi-tenanted environment where multiple workers are running at the same time and a worker is able to infer information about other workloads that currently physically co-located on the same computing device. However, as described herein, in some existing on-demand code execution systems, credentials can be reused after a request or session, which can also lead to additional security vulnerabilities. Thus, the use of scoped credentials can also improve security in an existing on-demand code execution system, by limiting the access rights for each code execution request or session to the smallest atomic level for the request or session. Moreover, following the request or session, the scoped credential may be invalidated, which can provide additional security. Thus, the systems and methods described herein can improve over existing serverless technologies.

Turning to FIG. 1A, an illustrative network environment 100 is shown in which a secure code-execution system 105 may rapidly provision execution environments for user-code execution. The network environment 100 may include user computing devices 102, a network 104, and a secure code-execution system 105. The secure code-execution system 105 may include a gateway service 112, a provisioning service 114, a credential service 116, an on-demand code execution system 110, auxiliary services 106, and data storage services 108. The constituents of the network environment 100 may be in communication with each other either locally or over the network 104. The user computing devices 102 may include any computing device capable of communicating with the secure code-execution system over the network 104, such as a client computing device. Example computing devices include a laptop or tablet computer, personal computer, personal digital assistant (PDA), hybrid PDA/mobile phone, mobile phone, and/or a smartphone.

While certain constituents of the network environment 100 are depicted as being in communication with one another, in some embodiments, any constituent of the network environment 100 can communicate with any other constituent of the network environment 100. For example, the gateway service 112 can communicate with any constituent of the network environment 100; however, not all of these communication lines are depicted in FIG. 1A.

A user computing device 102 can transmit a request to execute code instructions to the secure code-execution system 105. The gateway service 112 can receive the request. In response to receiving the request, the provisioning service 114 can cause a new execution environment to be instantiated in the on-demand code execution system 110. In some embodiments, if an execution environment is used for a session with multiple requests, then the execution environment may already exist for a particular request. The provisioning service 114 can further request credentials from the credential services 116 for the request or session. User-code can be executed on the on-demand code execution system 110 using the credentials. For example, the auxiliary services 106 or data storage services 108 may use the same or other credentials to provide data and/or execute tasks for the executed code on the on-demand code execution system 110.

Moreover, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of computing capacity (e.g., execution environment, containers, instances, etc., which are described in greater detail below) based on the code execution request, and execute the code using the computing capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The network-based data storage services 108 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage. An example data store can include a table in DynamoDB™, a distributed NoSQL database.

The network 104 may be any wired network, wireless network, or combination thereof. In addition, the network 104 may be a personal area network, local area network, wide area network, cable network, satellite network, cellular telephone network, or combination thereof. In addition, the network 104 may be an over-the-air broadcast network (e.g., for radio or television) or a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The user computing devices 102 and the secure code-execution system 105 may each be embodied in one or more devices. For example, the user computing devices 102 and the secure code-execution system 105 may include a network interface, memory, hardware processor, and non-transitory computer-readable medium drive, all of which may communicate with each other by way of a communication bus. The network interface may provide connectivity over the network 104 and/or other networks or computer systems. The hardware processor may communicate to and from memory containing program instructions that the hardware processor executes in order to operate the user computing devices 102 and the secure code-execution system 105. The memory generally includes RAM, ROM, and/or other persistent and/or auxiliary non-transitory computer-readable storage media.

Additionally, in some embodiments, the secure code-execution system 105 components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 1B:
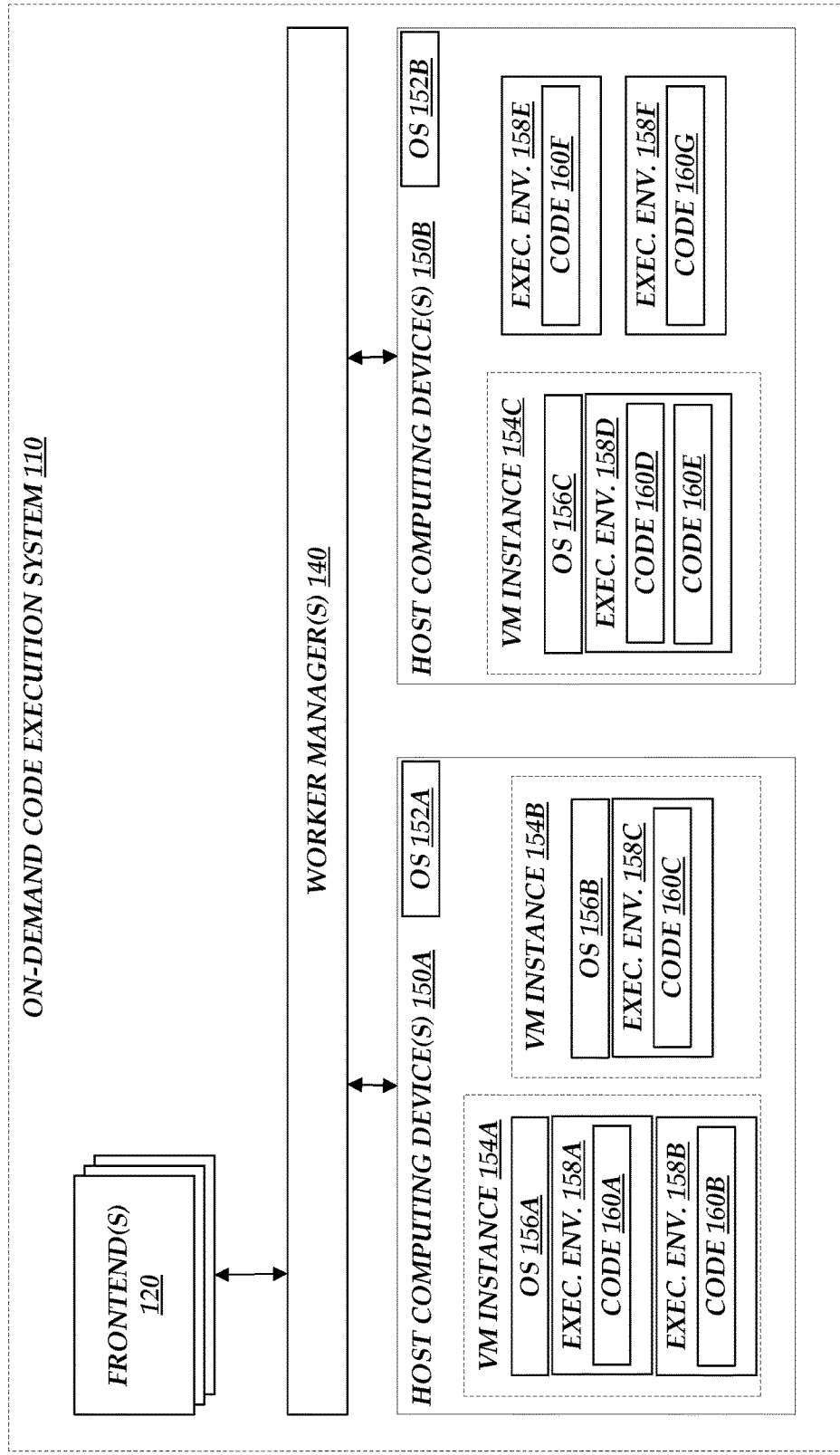
FIG. 1B is a block diagram depicting an illustrative environment in which an on-demand code execution system can execute tasks corresponding to code, which may be submitted by users of the on-demand code execution system.

Turning to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

References to user code as used herein may refer to any program code (e.g., a program, routine, subroutine, thread, etc.) written in a specific program language. In the present disclosure, the terms "code," "code instructions," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written in programming languages, such as, but not limited to, JavaScript, Java, Python, or Ruby. Tasks may be "triggered" for execution on the on-demand code execution system 110 in a variety of manners. In embodiments, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

To execute tasks, the on-demand code execution system 110 includes one or more worker managers 140 that manage the instances used for servicing incoming calls to execute tasks. In the example illustrated in FIG. 1B, each worker manager 140 manages an active pool of virtual machine instances 154A-154C, which are currently assigned to one or more users and are implemented by one or more physical host computing devices 150A-150B. The physical host computing devices 150A-150B and the virtual machine instances 154A-154C may further implement one or more execution environments 158A-158F, which may contain and execute one or more user-submitted code instructions 160A-160G. As described herein, execution environments can be logical units created within a virtual machine instance, or on a host computing device, using the resources available on that instance or device. For example, each worker manager 140 may, based on information specified in a call to execute a task, create a new execution environment or locate an existing execution environment 158A-158F and assign the execution environment to handle the execution of the task. Each execution environment may correspond to an execution environment for the task, providing at least some isolation from other execution environments. For example, each execution environment may provide a file system isolated from other file systems on the device, and code executing in the execution environment may have limited or no access to other file systems or memory space associated with code executing outside of the execution environment.

The execution environments 156A-156F, virtual machine instances 154A-154C, and host computing devices 150A-150B may further include language runtimes, code libraries, or other supporting functions (not depicted in FIG. 1B) that facilitate execution of user-submitted code 160A-160G. The physical computing devices 150A-150B and the virtual machine instances 154A-154C may further include operating systems 152A-152B and 156A-156C. In various embodiments, operating systems 152A-152B and 156A-156C may be the same operating system, variants of the same operating system, different operating systems, or combinations thereof.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-150B, virtual machine instances 154A-154C, and execution environments 158A-158F may be used to facilitate execution of user submitted code 160A-160G. In the illustrated example, the host computing device 150A implements two virtual machine instances 154A and 154B. Virtual machine instance 154A, in turn, implements two execution environments 158A and 158B, which contain user-submitted code 160A and 160B respectively. Virtual machine instance 154B implements a single execution environment 158C, which contains user-submitted code 160C. The host computing device 150B further implements a virtual machine instance 154C and directly implements execution environments 158E and 158F, which contain user-submitted code 160F and 160G. The virtual machine instance 154C, in turn, implements the execution environment 158D, which contains user-submitted code instructions 160D and 160E. It will be understood that these embodiments are illustrated for purposes of example, and that many other embodiments are within the scope of the present disclosure.

Figure 2:
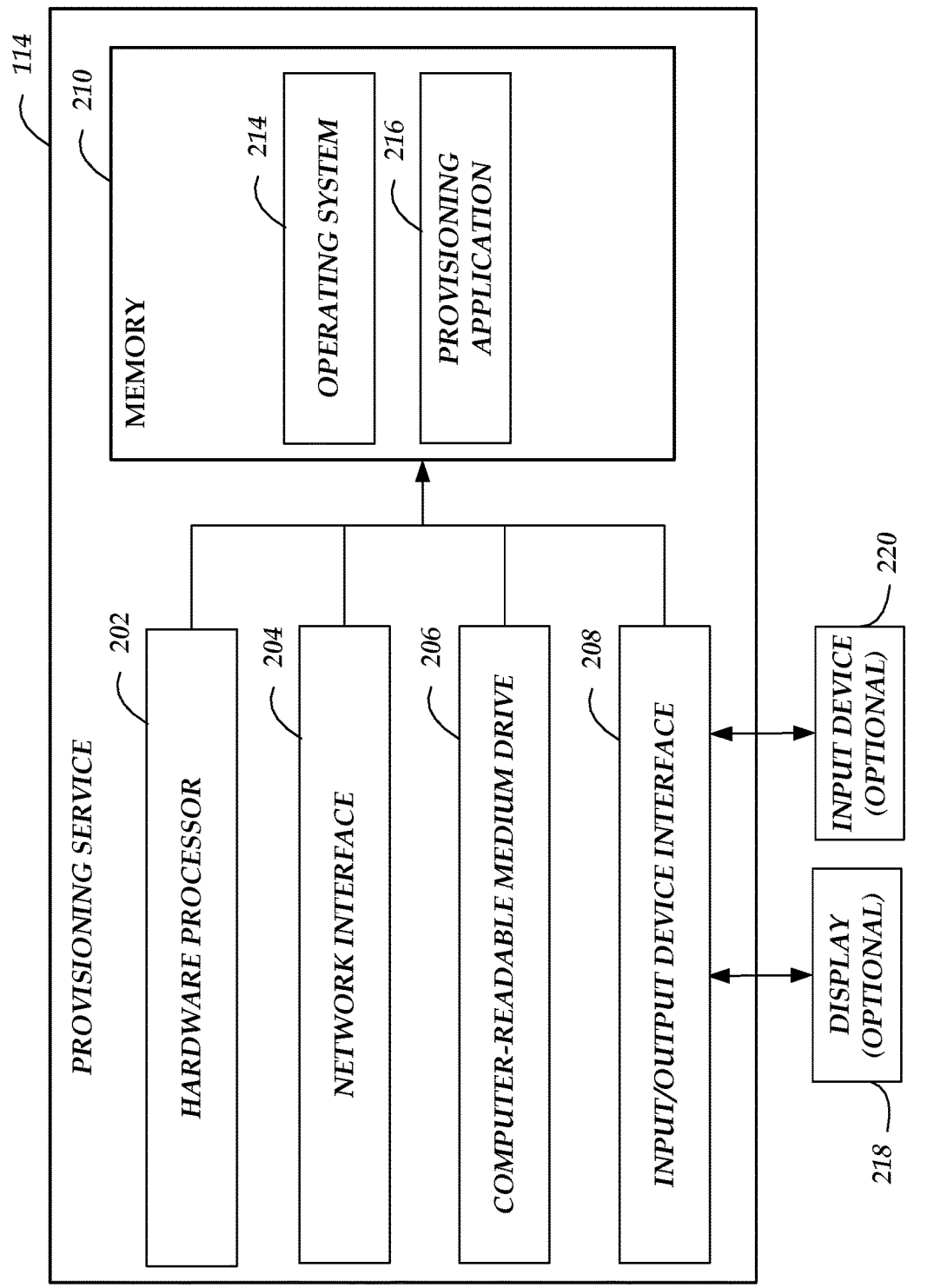
FIG. 2 depicts a general architecture of a computing device that is configured to implement a provisioning service of the network environment depicted in FIG. 1A.

FIG. 2 is a schematic diagram of an illustrative provisioning service 114 that can be used in the environment 100 in FIG. 1A. The provisioning service 114 includes an arrangement of computer hardware and software components that may be used to securely execute user code. While the general architecture of the provisioning service 114 is shown and described with respect to FIG. 2, the general architecture of FIG. 2 can be used to implement other services and/or applications described herein. Those skilled in the art will appreciate that the provisioning service 114 may include more (or fewer) components than those shown in FIG. 2. Further, other computing systems described herein may include similar implementation arrangements of computer hardware and software components.

The provisioning service 114 may include a hardware processor 202, a network interface 204, a non-transitory computer-readable medium drive 206, and an input/output device interface 208, all of which may communicate with one another by way of a communication bus. As illustrated, the provisioning service 114 is associated with, or in communication with, an optional display 218 and an optional input device 220. In other embodiments, the display 218 and input device 220 may be included in the user computing devices 102 shown in FIG. 1A. The network interface 204 may provide the provisioning service 114 with connectivity to one or more networks or computing systems. The hardware processor 202 may thus receive information and instructions from other computing systems (such as the user computing devices 102) or services via the network 104. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the provisioning service 114. The memory 210 generally includes RAM, ROM and/or other persistent or non-transitory computer-readable storage media. The memory 210 may store an operating system 214 that provides computer program instructions for use by the processing unit 202 in the general administration and operation of the provisioning service 114. The memory 210 may further include other information for implementing aspects of the provisioning service 114.

The memory 210 may include a provisioning application 216 that may be executed by the hardware processor 202. In some embodiments, the provisioning application may implement various aspects of the present disclosure. For example, the provisioning application 216 may instantiate the execution environments for the code execution and/or may retrieve credentials for the request or session.

Figure 3:
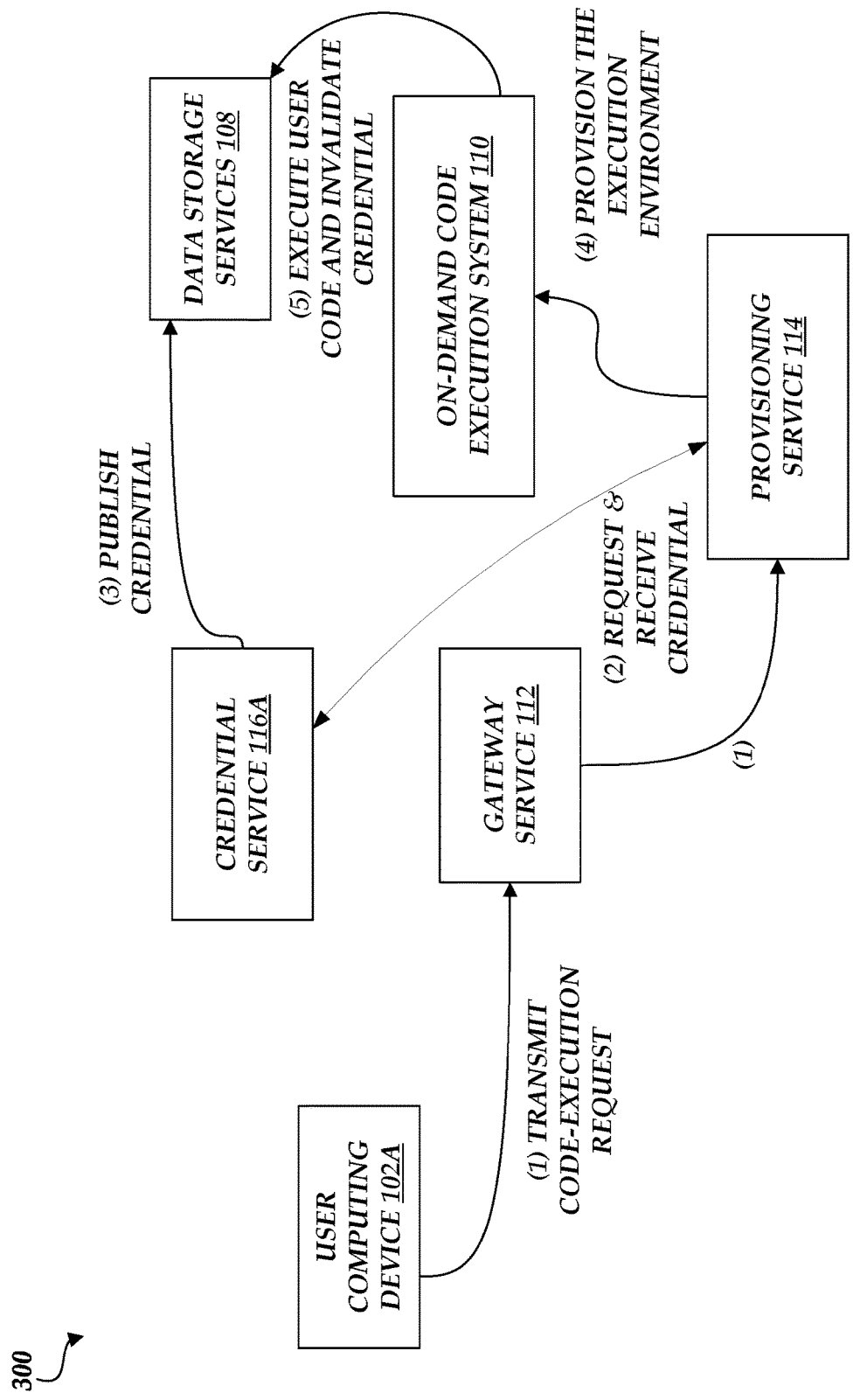
FIG. 3 is a flow diagram depicting illustrative interactions for provisioning secure execution environments and managing credentials.

With reference to FIG. 3, illustrative interactions are depicted for provisioning secure execution environments and managing credentials. The environment 300 of FIG. 3 can be similar to the environment 100 of FIG. 1A. For example, the user computing device 102A of FIG. 3 can be a computing device of user computing devices 102 of FIG. 1A. The depicted interactions in FIG. 3 are example interactions. Other interactions (not illustrated) may be possible in accordance with the present disclosure in other embodiments. Similar to the communication depictions of FIG. 1A, not every possible communication may be depicted in FIG. 3.

The interactions of FIG. 3 begin at step one (1), the user computing device 102A transmits a code-execution request to the gateway service 112. A code-execution request can include, for example, an image size request. The gateway service 112 can forward the request or a similar request to the provisioning service 114. The code-execution request can be associated with a user profile. The code-execution request can include an indication that the user code to be executed may access or rely on a resource.

At step two (2), the provisioning service 114 can submit a credential request for a user profile to the credential service 116A. The credential service 116A can generate a credential in response to the credential request. The credential can serve one or more purposes, such as generally providing permissions for the user code execution. The credential can authorize resource(s) for use for the particular request or session. As described herein, the credential can have a limited scope for a resource. The resource can be a data item, such as a specific data object, a specific row in a database, or a specific entry in a key-value database. The credential request can include sufficient context for the credential service 116A to generate a credential with custom data for the specific resource(s). An example context in the credential request can include data indicative of the resource(s), such as specific resource identifiers. The credential can include an authorization for the code-execution request to access a specific resource, such as an image file. At step two (2), the credential service 116A transmits the credential to the provisioning service 114.

Additionally or alternatively, while not depicted, the user computing device 102A can communicate with the credential service 116A. The credential request may be submitted, for example, via a GUI, CLI, or API. The code-execution request can include a credential in some embodiments. The user computing device 102A can submit a credential request for a user profile to the credential service 116A. The credential can have an execution policy for the credential, which allows the user computing device 102A access to execute user code instructions on the on-demand code execution system 110.

In some embodiments, at step three (3), the credential service 116A can publish the credential to other services, such as the data storage services 108. The data storage services 108 can use the credential at execution time to validate that the specific request has proper rights to carry out the requested task. In other embodiments, instead of the credential being pushed to other services, the other services can pull the credential from the credential service 116A, which may occur at a later time, such as at step five (5).

At step four (4), the provisioning service 114 can provision the execution environment in the on-demand code execution system 110. As described herein, the provisioned execution environment can be a single-use environment for the request or session. In some embodiments, the provisioning service 114 can publish the credential to the on-demand code execution system 110. The on-demand code execution system 110 can use the credential at execution time to validate that the specific request has proper rights to carry out the requested task. In other embodiments, instead of the credential being pushed to on-demand code execution system 110, the on-demand code execution system 110 can pull the credential from the credential service 116A, which may occur at a later time, such as at step five (5).

At step five (5), the user code instructions can be executed in the execution environment on a virtual machine instance in the on-demand code execution system 110. Moreover, the user code instructions can use the credential to access the resource, such as retrieving a specific data item from the data storage services 108 (such as a first image file). The user code instructions can use the credential to be authorized to carry out certain tasks. The user code instructions can execute the requested task (e.g., resizing the first image file). While not illustrated, the result or a message can be transmitted back to the user computing device 102A. The credential can be invalidated by a service or system, such as the credential service 116A, the on-demand code execution system 110, and/or the data storage services 108.

As described herein, a second request can be processed by steps one (1), two (2), three (3), four (4), or five (5) in a similar manner. The credential for the second request can be limited to a different resource. If the code instructions for the second request attempts to access the resource of the first request (such as the first image file), then the attempt can fail due to the credential being invalidated.

Figure 4:
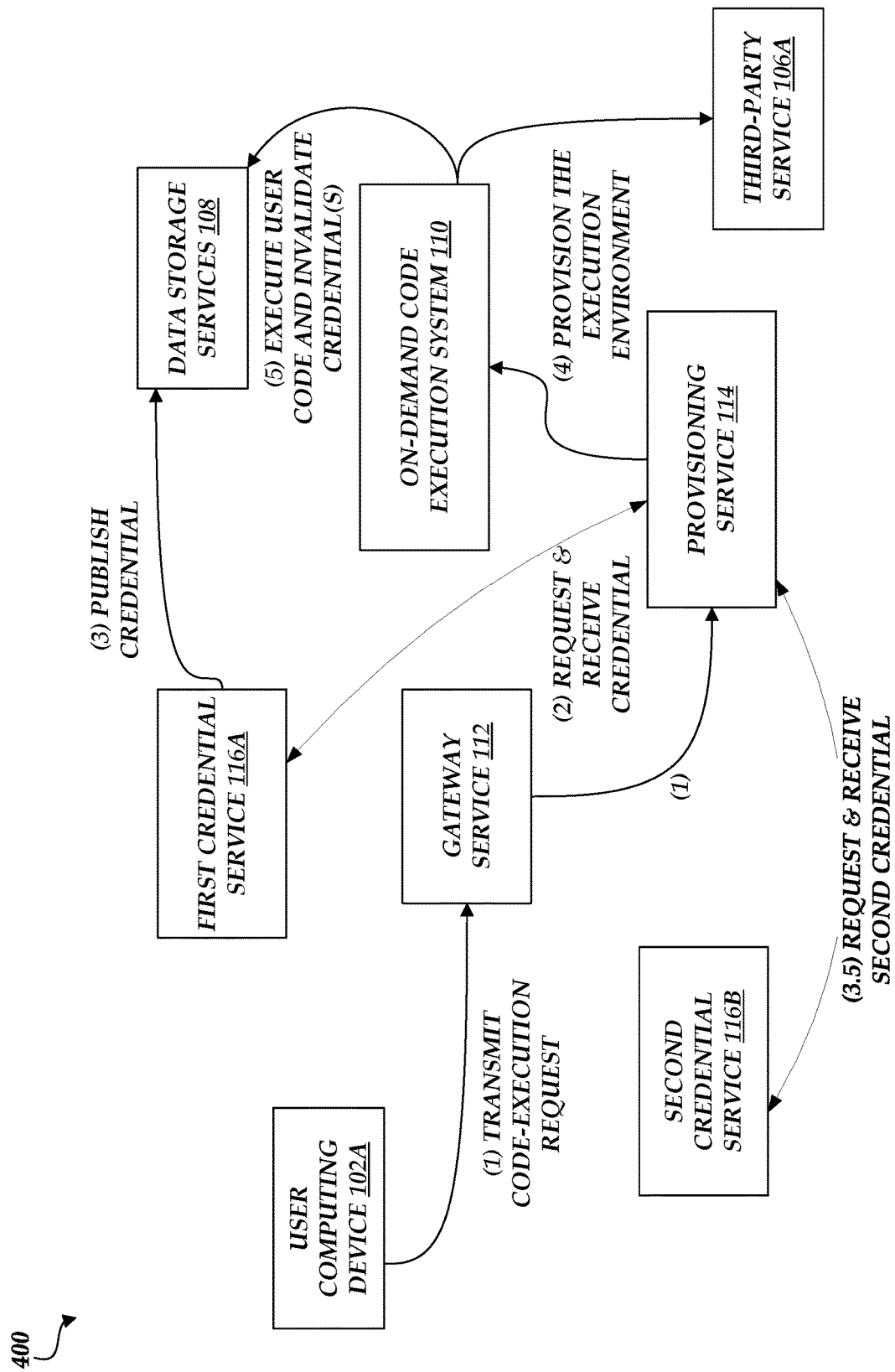
FIG. 4 is a flow diagram depicting illustrative interactions for credential management with respect to a third-party service.

With reference to FIG. 4, illustrative interactions are depicted with respect to credential management with a third-party service. The environment 400 of FIG. 4 can be similar to the environment 300 of FIG. 3. However, the environment 400 of FIG. 4 can include a second credential service 116B and a third-party service 106A. In particular, the steps one (1), two (2), and/or three (3) of FIG. 4, which can include processing a first credential from the first credential service 116A, can be similar to the steps one (1), two (2), and/or three (3) of FIG. 3.

However, at step three-point-five (3.5) the provisioning service 114 can request and receive a second credential from the second credential service 116B. An example second credential service 116B can include Amazon Cognito™, a user profile service that integrates with third-party services or applications. The second credential service 116B can provide a user profile that is different from the user profile associated with either request at steps one (1) or three (3). Accordingly, the second user profile allows an impersonation to execute commands with the third-party service 106A.

At step four-prime (4'), the provisioning service 114 can provision the execution environment in the on-demand code execution system 110, which can be similar to step four (4) of FIG. 3. However, the provisioning service 114 can push the second credential to the execution environment in the on-demand code execution system 110. At step five-prime (5'), the user code instructions can be executed in the execution environment on a virtual machine instance in the on-demand code execution system 110, which can be similar to step five (5) of FIG. 3. However, the user code instructions can use the second credential, such as by transmitting a command to the third-party service 106A with the second credential. As described herein, the second credential can provide permissions associated with the second user profile. The second credential can be similar to the first credential, in that both credentials can be single-use credentials, in that the credentials expire after a request or session. In particular, either or both the first credential or the second credential can be invalidated by a service or system, such as the credential service 116A, the on-demand code execution system 110, the data storage services 108, and/or the third-party service 106A.

Figure 5:
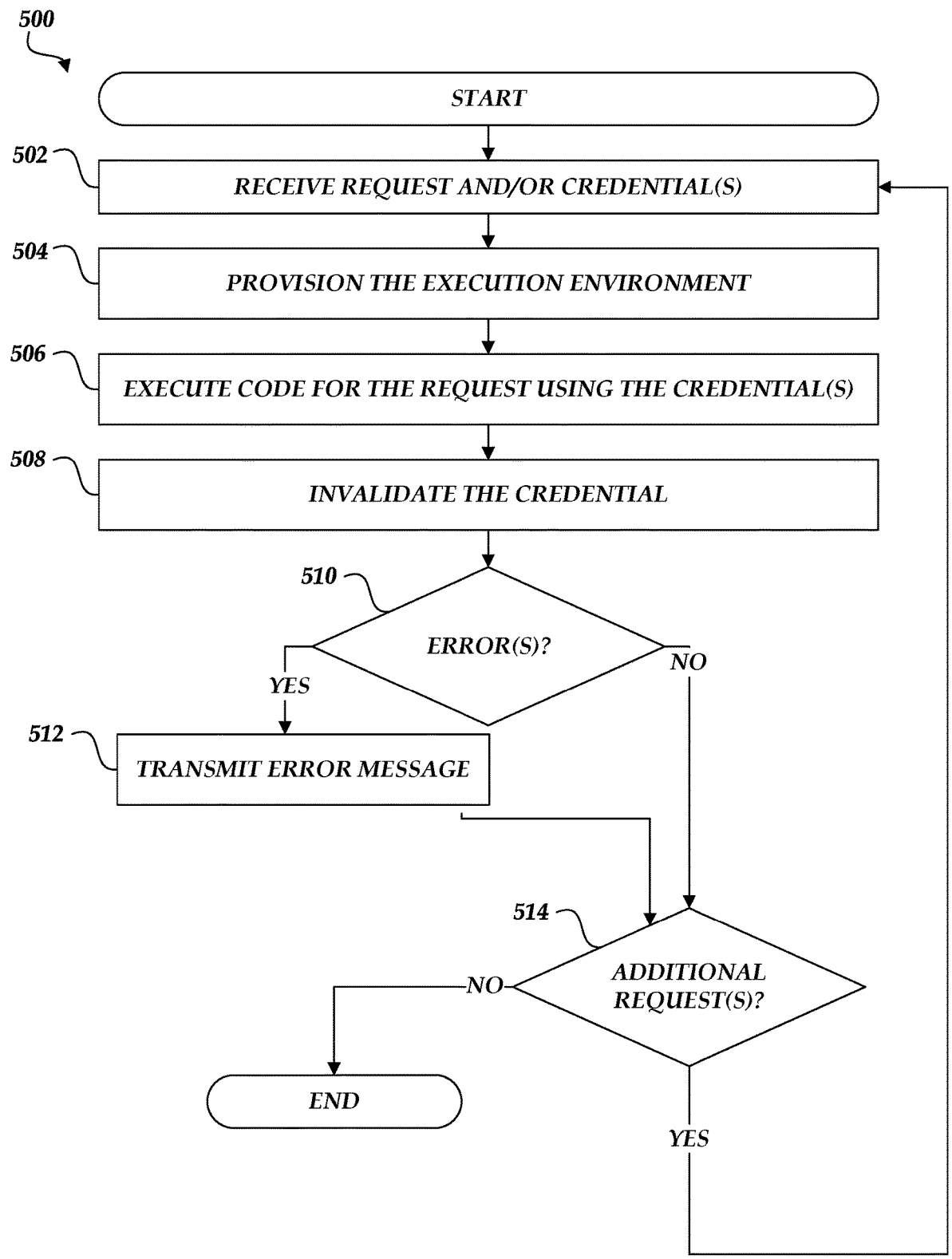
FIG. 5 is a flow chart depicting an example method for securely processing code-execution requests with scoped credentials.

FIG. 5 is a flow diagram depicting an example method 500 implemented by the secure code-execution system 105 for securely processing code-execution requests with scoped credentials. As described herein, the secure code-execution system 105 may include the provisioning service 114. In some embodiments, the provisioning service 114 may include the provisioning application 216, and may implement aspects of the method 500.

At block 502, a code-execution request can be received. For example, the gateway service 112 can receive a code-execution request from the user computing device 102A. In some embodiments, the code-execution request can be for a user profile. The code-execution request can include an indication for a user profile. The request can be processed in part by the provisioning service 114.

The provisioning service 114 can request a credential from a service, such as the credential service 116A. The credential service 116A can generate the credential, which can authorize access to a resource. The credential request can be for a particular user profile. The credential can authorize access for a resource associated with the code-execution request. As described herein, such as with respect to FIG. 3, the credential service 116A can generate a credential in response to the credential request. The credential can serve one or more purposes. An example purpose for the credential can be to authorize resource(s) for use for the particular request or session, which can include allowing a resource to be created, retrieved, modified, and/or deleted. In particular, the credential can be scoped to the smallest atomic level for the particular request or session, such as by being limited to a data item. Example data items can include a specific data object, a specific row in a database, or a specific entry in a key-value database. Additional example resources can be network connections or network daemons. The credential can be transmitted to the on-demand code execution system 110, which is described in further detail below at block 504. An example use for the credential can include using the credential to sign objects or data. Another additional example use for the credential can be to use the credential as a key to decrypt encrypted data. For example, the credential can be used to decrypt a resource. The credential can provide permissions to the user code to create, retrieve, modify, or delete data. For example, the credential can include a policy authorizing creation of a resource.

The credential request can include sufficient context for the credential service 116A to generate a credential with custom data for the specific resource(s). An example context in the credential request can include data indicative of the resource(s), such as specific resource identifiers. Additionally or alternatively, the credential service 116A can generate the credential for a user profile and/or resource. As part of generating the credential, the credential service 116A can generate a custom policy for the resource, where the custom policy indicates that access to the resource expires after execution of the code-execution request. The custom policy can be encrypted within the credential. For example, to determine whether a request to access a resource is valid or not, the on-demand code execution system 110 can decrypt the custom policy within the credential and process the custom policy to determine that the credential is no longer valid to access the resource.

As described herein, the credential service 116A and/or the provisioning service 114 can publish the generated credential to other services or systems, such as the data storage services 108 and/or the on-demand code execution system 110. The data storage services 108 and/or the on-demand code execution system 110 can use the credential at execution time to validate that a specific request has proper rights to carry out the requested task. In other embodiments, instead of the credential being pushed to services or systems, the services or systems can pull the credential from the credential service 116A.

Additionally or alternatively, some credential requests and/or generation of credentials can occur at different times. For example, instead of or in addition to the provisioning service 114 requesting a credential for a resource, the user computing device 102A can request a credential from the credential service 116A. Thus, in some embodiments, a credential can be included in the code-execution request.

At block 504, the execution environment can be provisioned. For example, the provisioning application 216 can cause an execution environment to be instantiated or reset for each request or session. In particular, the execution environment can be in a virtual machine instance in the on-demand code execution system 110. In some embodiments, the provisioning application 216 can inject one or more credentials into the execution environment for the request or session.

At block 506, the user code can be executed using the credential(s). For example, user code can be executed in a virtual machine instance in the on-demand code execution system 110 within the execution environment. The user code can use the credential to access a resource and/or to request access for a resource. As described herein, the credential can be scoped to the smallest atomic unit for the specific request, such as by only providing access to a specific data item for the request. For example, the user code instructions can use the credential to request a specific data item from a data source. The data item can be received from the data source. In some embodiments, a service from the data storage services 108 can embody the data source and requesting the data item can include transmitting a data retrieval request that can include the credential. As another example, execution of the user code instructions can cause a deletion request with the credential to be sent for the data item to the data storage services 108. Execution of the user code instructions can verify an authorizing policy in a credential, such as a policy to create, update, modify or delete a resource. Thus, the execution of the user code instructions can cause creation, an update or modification, or a deletion of resource using the credential. Additional examples for using the credential are provided herein. The user code instructions can execute the requested task. A result of the user code processing or a message associated with the result, such as a success message, can be transmitted to the user computing device 102A.

At block 508, the credential can be invalidated. For example, a service or system, such as the credential service 116A, the on-demand code execution system 110, and/or the data storage services 108, can invalidate the credential. The credential can be invalidated such that the credential is no longer valid for further use. In particular, the credential can no longer be valid for at least accessing the resource. Example invalidation can include a service (such as the data storage services 108) or the on-demand code execution system 110 designating that the credential is invalid for further use. Additionally or alternatively, the credential can include policy information that indicates whether the credential or some aspect of the credential is invalid or not. For example, an authorized application may be able to decrypt the credential to determine whether the policy associated with the credential is valid or not. The credential can be invalid following execution of the user code. Thus, part of invalidating the credential can include completing the code execution request.

In some embodiments, a credential can be valid for a particular number of uses. Thus, invalidating the credential can include decrementing a number of uses the credential can be used. The associated metadata for the credential (such as the decremented number of uses) can be stored by a service or the on-demand code execution system 110. Additionally or alternatively, the associated metadata (such as the decremented number of uses) can be included in the credential. For example, decrementing the number of uses the credential can be used can include updating a policy associated with the credential to reflect a decremented value for the number of times the first credential can be used. In some embodiments, the policy can be embedded within the credential.

At block 510, it can be determined whether there are any errors. For example, the on-demand code execution system 110, such as a virtual machine instance thereof, can determine whether authorization for a resource failed based on the credential. If there is an error, at block 512, an error message can be transmitted. For example, the on-demand code execution system 110, which can be processing second user code in a second execution environment, can cause an error message to be transmitted to the user computing device 102A. The error message can indicate that access was denied to the data item. Additional error messages can include a message that a data item creation, update, or delete failed based on an invalid credential. Since the credentials described herein are limited in scope, if a subsequent request or session attempts to reuse the credential, then the attempt fails and an error message can be transmitted to the user computing device 102A or a reporting service to identify security attacks. In particular, a data item can be requested from a data source using the same credential a second item. The data source can provide an error that indicates that the credential is invalid.

At block 514, additional requests can be processed. For example, a second code execution request can be processed that can result in execution of the previous blocks 502, 504, 506, 508, 510, and/or 512. As described above, if a subsequent request or session attempts to reuse the credential (for example, requesting to access a resource, such as a data item, a second item), then the attempt fails.

Figure 6:
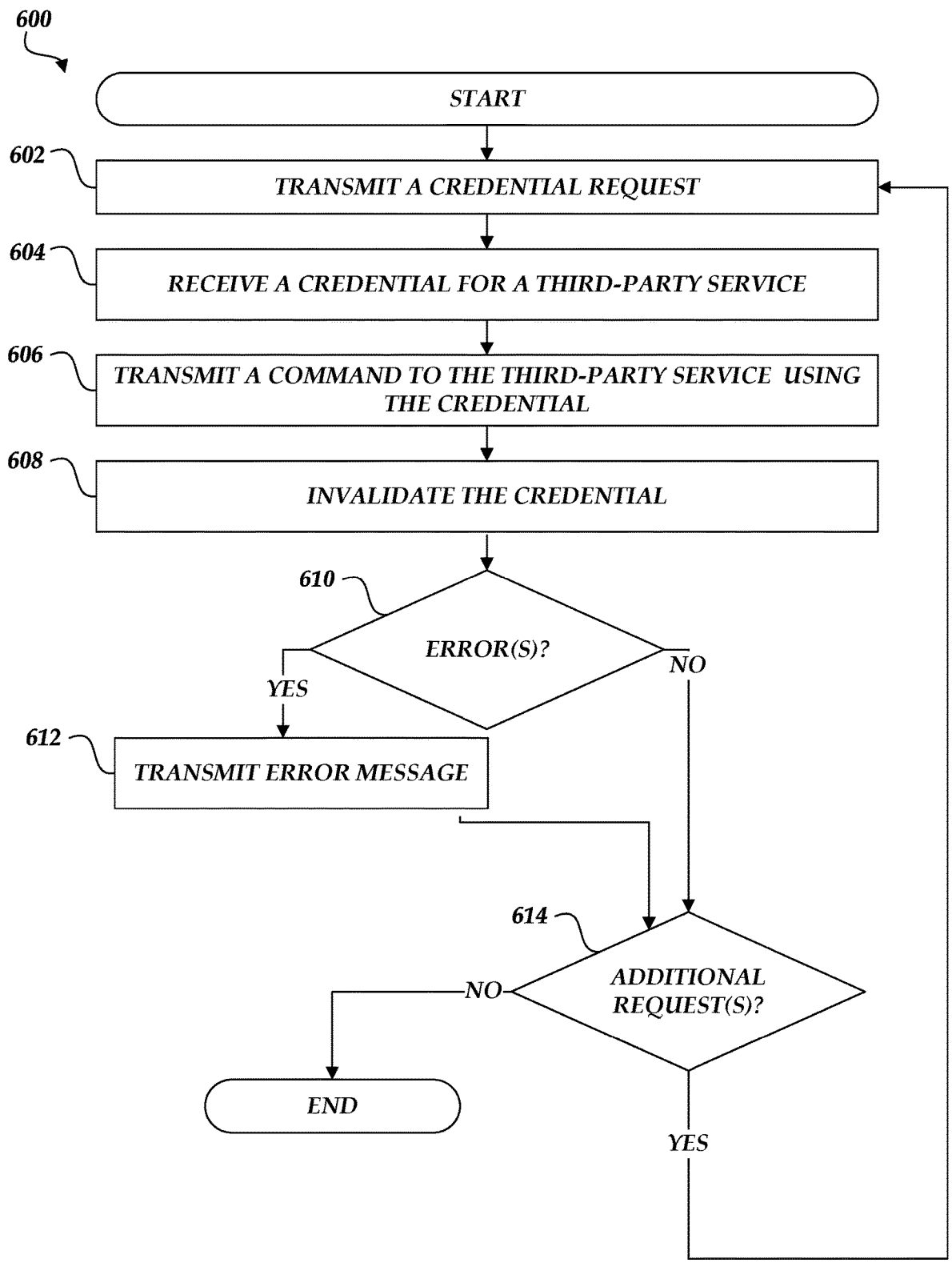
FIG. 6 is a flow chart depicting an example method for processing secure code-execution requests with a third-party service with scoped credentials.

FIG. 6 is a flow diagram depicting an example method 600 implemented by the secure code-execution system 105 for processing secure code-execution requests with scoped credentials. As described herein, the secure code-execution system 105 may include the provisioning service 114. In some embodiments, the provisioning service 114 may include the provisioning application 216, and may implement aspects of the method 600. Moreover, as described below, blocks of the method 600 of FIG. 6 may be similar to and/or used in conjunction with the blocks of the method 500 of FIG. 5.

At block 602, a credential request can be transmitted. For example, the provisioning application 216 can request a credential from a service, such as a second credential service 116B. As described above with respect to FIG. 4, the second credential service 116B can be a user profile service that is integrated with third-party services, such as Amazon Cognito™. The block 602 of FIG. 6 to request a second credential can occur in conjunction with or after block 502 of FIG. 5 for requesting and/or receiving a first credential from a first credential service 116A.

At block 604, the second credential can be received. For example, the provisioning application 216 can receive the second credential from the second credential service 116B. As described herein, the second credential can be for a second user profile that is different from the first user profile associated that is initially received with a code-execution request. Accordingly, the second user profile allows an impersonation to execute commands with the third-party service 106A.

The block 604 of FIG. 6 to receive the second credential can occur in conjunction with or after block 504 of FIG. 5 for provisioning the execution environment. The provisioning application 216 can publish the second credential to the provisioned execution environment in the on-demand code execution system 110.

At block 606, a command can be transmitted to the third-party service using the second credential. For example, the user code executed in the virtual machine instance in the on-demand code execution system 110 within the execution environment can transmit the command to the third-party service using the second credential. Accordingly, the block 606 for executing a third-party service call on-demand can occur as a part of the block 506 in FIG. 5 for user code execution. The second credential can authorize the command for execution by the third-party service 106A. As described herein, the second credential, like other credentials described herein, can be a single-use credential and can be valid for a particular request or session. Example commands can include create, updated, or delete commands for a resource, such as a data item. Accordingly, for a create command, the credential can include a policy authorizing creation of a resource. In such a case, the on-demand code execution system 110, can transmit, to the data storage services 108, a creation request for a resource where the creation request includes the credential.

At block 608, the second credential can be invalidated. For example, a service or system, such as the second credential service 116B, the on-demand code execution system 110, the provisioning service 114, and/or the third-party service 106A, can invalidate second the credential. The block 608 of FIG. 6 for invalidating the second credential can be similar to the block 508 of FIG. 5 for invalidating the first credential. Accordingly, as described herein, the third-party service 106A can be integrated with the secure code-execution system 105 such that an invalidated second credential will not have sufficient permissions with the third-party service 106A to execute a command associated with the invalidated second credential.

The remaining blocks 610, 612, and 614 for processing errors, error messages, and additional requests for credentials associated with the second credential service 116B may be similar to the blocks 510, 512, 514 for processing errors, error messages, and additional requests for credentials associated with the first credential service 116A. For example, if any additional requests include the same second credential after an executed request or session, an error may be generated and communicated to the user computing device 102A or another device or system.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method comprising:
   under control of a computer hardware processor configured with specific computer executable instructions,
      receiving, from a first computing device associated with a user profile, first code instructions for execution in an on-demand code execution system;
      receiving, from a second computing device associated with the user profile, a code-execution request to execute the first code instructions in the on-demand code execution system, the code-execution request associated with the user profile;
      generating a credential for the user profile, the credential authorizing access for a resource associated with the code-execution request;
      executing, in the on-demand code execution system, the first code instructions in a first execution environment on a virtual machine instance, wherein executing the first code instructions further comprises:
         requesting access to the resource using the credential, wherein requesting access to the resource further comprises:
            transmitting, to a data source, a data retrieval request for the resource, the data retrieval request comprising the credential;
         receiving access to the resource; and
         transmitting, to the data source, an update to the resource including the credential; and
      invalidating the credential, wherein invalidating the credential further comprises:
         designating, at the data source, that the credential is invalid for further use with the data source, wherein the credential is no longer valid for at least accessing the resource.

2. The computer implemented method of claim 1, wherein the resource comprises a data item.

3. The computer implemented method of claim 2, wherein the data item comprises at least one of a data object, a row in a database, or an entry in a key-value database.

4. The computer implemented method of claim 2, wherein the code-execution request comprises data indicative of at least the resource, and wherein generating the credential further comprises:

generating custom data for the resource based at least on the data indicative of the data item, the credential comprising the custom data.

5. A system comprising:
a data storage medium; and
one or more computer hardware processors in communication with the data storage medium, the one or more computer hardware processors configured to execute computer-executable instructions to at least:
receive, from a first computing device associated with a first user profile, first code instructions for execution in an on-demand code execution system;
receive, from a second computing device associated with the first user profile, a code-execution request to execute the first code instructions in the on-demand code execution system, the code-execution request associated with the first user profile;
generate a first credential for the first user profile, the first credential authorizing access for a resource associated with the code-execution request;
execute, in the on-demand code execution system, the first code instructions in a first execution environment on a virtual machine instance, wherein to execute the first code instructions, the one or more computer hardware processors is further configured to:
request access to the resource using the first credential, wherein to request access to the resource, the one or more computer hardware processors is further configured to:
transmit, to a data source, a data retrieval request for the resource, the data retrieval request comprising the first credential;
receive access to the resource; and
transmit, to the data source, an update to the resource including the first credential; and
invalidate the first credential, wherein to invalidate the first credential, the one or more computer hardware processors is further configured to:
designate, at the data source, that the first credential is invalid for further use with the data source.

6. The system of claim 5, wherein the one or more computer hardware processors is further configured to:
request, from a credential service, a second credential for a third-party service, wherein to execute the first code instructions, the one or more computer hardware processors is further configured to:
transmit, to the third-party service, a command comprising the second credential.

7. The system of claim 6, wherein the request for the second credential is for a second user profile different than the first user profile, and wherein the second credential provides permissions for the second user profile with the third-party service.

8. The system of claim 6, wherein the second credential provides a single use of the third-party service.

9. The system of claim 5, wherein to invalidate the first credential, the one or more computer hardware processors is further configured to:
decrement a number of times the first credential can be used.

10. The system of claim 9, wherein to decrement the number of times the first credential can be used, the one or more computer hardware processors is further configured to:
update a policy associated with the first credential to reflect a decremented value for the number of times the first credential can be used.

11. A system comprising:
a data storage medium; and
one or more computer hardware processors in communication with the data storage medium, the one or more computer hardware processors configured to execute computer-executable instructions to at least:
receive, from a first computing device associated with a user profile, first code instructions for execution in an on-demand code execution system;
receive, from a second computing device associated with the user profile, a code-execution request to execute the first code instructions in the on-demand code execution system, the code-execution request associated with the user profile;
generate a credential for a first resource associated with the code-execution request;
execute, in the on-demand code execution system, the first code instructions in a first execution environment on a virtual machine instance, wherein to execute the first code instructions, the one or more computer hardware processors is further configured to:
request access to the first resource using the credential, wherein to request access to the first resource, the one or more computer hardware processors is further configured to:
transmit, to a data source, a data retrieval request for the first resource, the data retrieval request comprising the credential;
receive access to the first resource; and
transmit, to the data source, an update to the first resource including the credential; and
invalidate the credential, wherein to invalidate the credential, the one or more computer hardware processors is further configured to:
designate, at the data source, that the credential is invalid for further use with the data source, wherein the credential is no longer valid for at least accessing the first resource.

12. The system of claim 11, wherein the first resource comprises at least one of a network connection or a network daemon.

13. The system of claim 11, wherein the credential provides a permission for the first code instructions to update the first resource.

14. The system of claim 11, wherein to generate the credential comprises, the one or more computer hardware processors is further configured to:
generate a custom policy for the first resource, wherein the custom policy indicates that access to the first resource expires after execution of the code-execution request.

15. The system of claim 14, wherein to generate the credential comprises, the one or more computer hardware processors is further configured to:
encrypt the custom policy within the credential.

16. The system of claim 15, wherein to request access to the first resource using the credential, the one or more computer hardware processors is further configured to:
decrypt the custom policy within the credential; and
process the custom policy to determine that the credential is no longer valid to access the first resource.

17. The system of claim 11, wherein the credential comprises a policy authorizing creation of a second resource, wherein to execute the first code instructions, the one or more computer hardware processors is further configured to:

verify the policy authorizing creation of a second resource; and create the second resource.

18. The system of claim 11, wherein to request access to the first resource, the one or more computer hardware processors is further configured to:

decrypt the first resource using the credential.

* * * * *